US011996987B2

(12) United States Patent
Nguyen et al.

(10) Patent No.: US 11,996,987 B2
(45) Date of Patent: May 28, 2024

(54) REAL-TIME DIAGNOSTIC MONITORING AND CONNECTIVITY ISSUE RESOLUTION BY A MACHINE-LEARNING DATA MODEL

(71) Applicant: T-MOBILE INNOVATIONS LLC, Overland Park, KS (US)

(72) Inventors: Phi Hoang Nguyen, Bellevue, WA (US); Kevin Ka-Kin Lau, Issaquah, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/230,533

(22) Filed: Aug. 4, 2023

(65) Prior Publication Data

US 2023/0379224 A1 Nov. 23, 2023

Related U.S. Application Data

(63) Continuation of application No. 17/714,481, filed on Apr. 6, 2022, now Pat. No. 11,765,045.

(51) Int. Cl.
| | | |
|---|---|---|
| *H04L 41/147* | (2022.01) | |
| *H04L 41/16* | (2022.01) | |
| *H04L 43/028* | (2022.01) | |
| *H04L 43/0811* | (2022.01) | |
| *H04W 4/02* | (2018.01) | |
| *H04W 24/04* | (2009.01) | |

(52) U.S. Cl.
CPC ............ *H04L 41/147* (2013.01); *H04L 41/16* (2013.01); *H04L 43/028* (2013.01); *H04L 43/0811* (2013.01); *H04W 4/025* (2013.01); *H04W 24/04* (2013.01)

(58) Field of Classification Search
CPC ..... H04L 41/147; H04L 41/16; H04L 43/028; H04L 43/0811
See application file for complete search history.

(56) References Cited

U.S. PATENT DOCUMENTS

| | | | | |
|---|---|---|---|---|
| 8,655,307 | B1 * | 2/2014 | Walker | H04W 68/005 |
| | | | | 455/574 |
| 10,484,257 | B1 * | 11/2019 | Louca | H04L 43/04 |
| 2017/0034192 | A1 * | 2/2017 | Schulman | H04L 63/1416 |
| 2017/0353477 | A1 * | 12/2017 | Faigon | G06F 21/554 |
| 2019/0324881 | A1 * | 10/2019 | Buffone | G06F 11/0709 |
| 2021/0028973 | A1 * | 1/2021 | Côté | H04J 3/1652 |

* cited by examiner

*Primary Examiner* — Philip C Lee
(74) *Attorney, Agent, or Firm* — Shook, Hardy & Bacon L.L.P.

(57) ABSTRACT

A system, methods, and computer-readable media are provided herein for real-time "live" identification of connectivity issues with autonomous predictive solution provision via a diagnostic application supported by a machine-learning model. In aspects, live data in a targeted application is captured in an on-going manner and used by the diagnostic application to automatically identify connectivity issues. When connectivity issues are detected, the live data capture is pushed to the model so that the model can make a predictive classification of the error based on geospatial, temporal, and/or geospatial-temporal alignments in the data. Based on the classification, the model predicts a solution and the diagnostic application provides the solution to the user of the targeted application.

20 Claims, 5 Drawing Sheets

REAL-TIME DIAGNOSTIC MONITORING AND CONNECTIVITY ISSUE RESOLUTION BY A MACHINE-LEARNING DATA MODEL

CROSS REFERENCE TO RELATED APPLICATION

This application is a continuation that claims the benefit of priority to U.S. application Ser. No. 17/714,481, entitled "Real-Time Diagnostic Monitoring and Connectivity Issue Resolution By A Machine-Learning Data Model" and filed on 6 Apr. 2022, the entirety of which is incorporated by reference herein.

TECHNICAL BACKGROUND

The present disclosure generally relates to artificial intelligence/machine-learning data model.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present disclosure is defined by the claims as supported by the Specification, including the Detailed Description.

In brief and at a high level, this disclosure describes, among other things, methods, systems, and computer-readable media for using real-time "live" monitoring of a particular application to capture data and automatically detect errors and/or connectivity issues through a diagnostic application that runs in the background. The diagnostic application, upon detecting an error, captures live data which is ingested by a machine-learning model that has been trained using a training data set obtained from and/or that is specific to the particular application being monitored. As such, while the following Description generally discuss one model and one target application, it is contemplated and with the scope of aspects herein the multiple models can be used, each model being specifically trained for and evaluating specific target applications. The model can classify the detected error based on pattern matching and/or geospatial, temporal, and/or geospatial-temporal alignment. Once identified, a known solution (when available) can automatically identified by the model and provided via the target application for immediate, real-time implementation to cure the error and prevent further occurrence of that error.

In one aspect, a computerized method is provided. In accordance with the method, a diagnostic application that is supported by a trained machine-learning model is executed. The diagnostic application monitors, in real-time, a target application that presents a user interface at a computing device. Based on the diagnostic application monitoring the target application, a connectivity issue is automatically detected. In response to detecting the a connectivity issue, data is automatically obtained. The data includes, for example, one or more of a network log, a browser log, a message, a target application activity log, or a screen capture of the user interface. In aspects, one or more of geospatial alignment, temporal alignment, or geospatial and temporal alignment of the connectivity issue are identified by the trained machine-learning model, based on the data obtained. The trained machine-learning model further identifies, in some aspects, that the connectivity issue corresponds to a particular classification based on the one or more of geospatial alignment, temporal alignment, or geospatial and temporal alignment. The diagnostic application provides, based on the particular classification, a solution for the connectivity issue to the computing device.

In another aspect, one or more non-transitory computer-readable media having computer-executable instructions embodied thereon are provided that, when executed, perform a method.

The media comprises executing a diagnostic application supported by a trained machine-learning model, wherein the diagnostic application monitors, in real-time, a target application that presents a user interface at a computing device. Based on the diagnostic application monitoring the target application, a connectivity issue is automatically detected. In response to detecting the connectivity issue, data is automatically obtained that includes one or more of a network log, a browser log, a message, a target application activity log, or a screen capture of the user interface. The trained machine-learning model identifies one or more of geospatial alignment, temporal alignment, or geospatial and temporal alignment of the data obtained for the connectivity issue. The trained machine-learning model further identifies that the connectivity issue corresponds to a particular classification based on the one or more of geospatial alignment, temporal alignment, or geospatial and temporal alignment. In aspects, the machine-learning model identifies a solution to the connectivity issue based at least in part on the particular classification. The diagnostic application provides, based on the particular classification, a solution for the connectivity issue to the computing device.

In yet another aspect, a system is provided. The system comprises one or more processors and a machine-learning model. The system further comprises a diagnostic application supported by a machine-learning model and that is executed locally or remotely via the one or more processors. In aspects, the diagnostic application monitors, in real-time, a target application that presents a user interface at a computing device. Based on the diagnostic application monitoring the target application, the diagnostic application automatically detects a connectivity issue. In response to detecting the a connectivity issue, the diagnostic application automatically obtains data that includes one or more of a network log, a browser log, a message, a target application activity log, or a screen capture of the user interface. Via the trained machine-learning model, one or more of geospatial alignment, temporal alignment, or geospatial and temporal alignment of the data obtained for the connectivity issue are identified. In aspects, the trained machine-learning model identifies that the connectivity issue corresponds to a particular classification based on the one or more of geospatial alignment, temporal alignment, or geospatial and temporal alignment. The machine-learning model further identifies a solution to the connectivity issue based at least in part on the particular classification. The diagnostic application provides, in real-time and based on the particular classification, a solution for the connectivity issue to the computing device.

BRIEF DESCRIPTION OF THE DRAWINGS

Aspects are described in detail below with reference to the attached drawings figures, wherein.

DETAILED DESCRIPTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1:
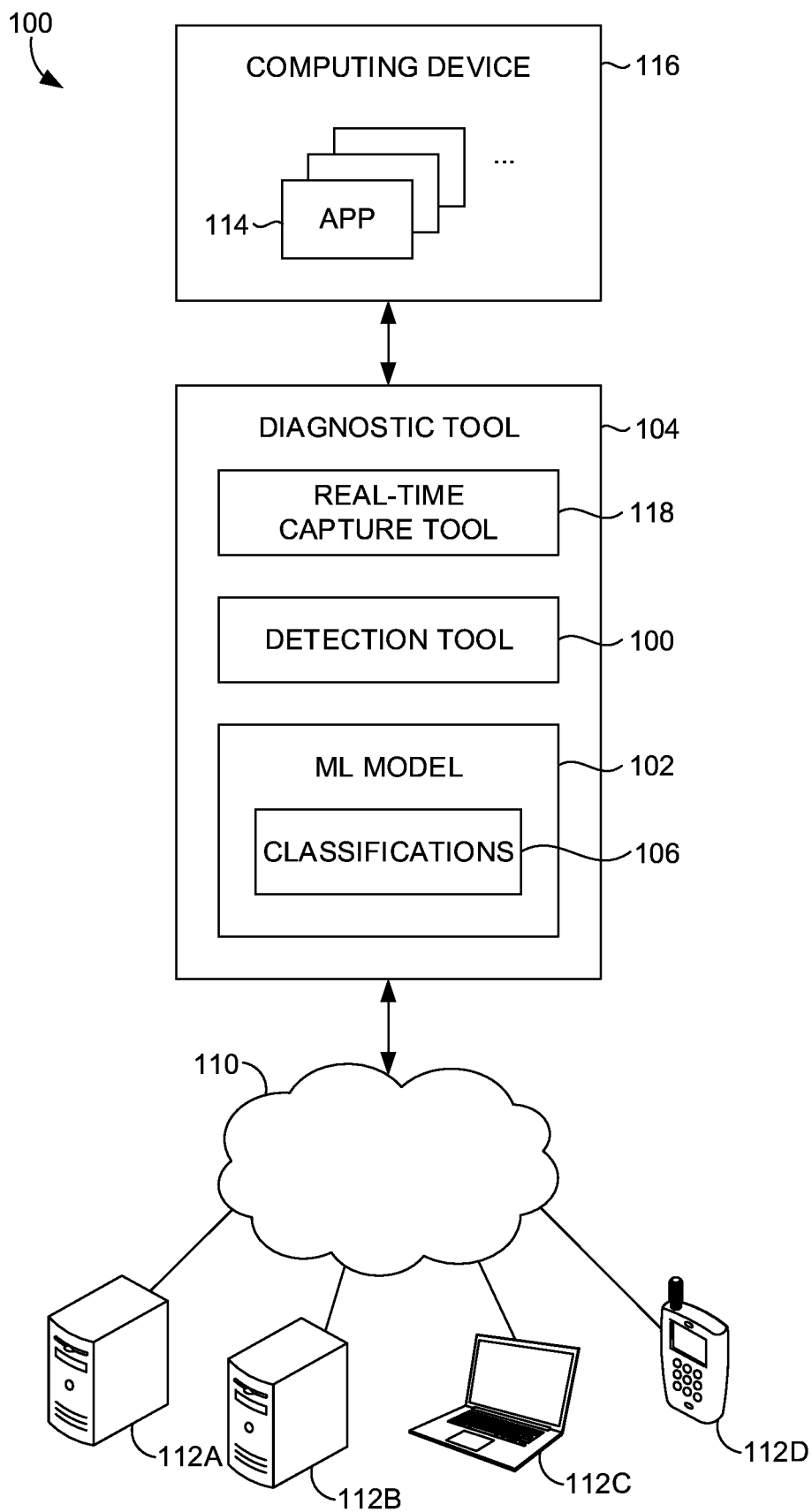
FIG. 1 is a block diagram of an example system suitable to implement aspects of the present disclosure.
Figure 2:
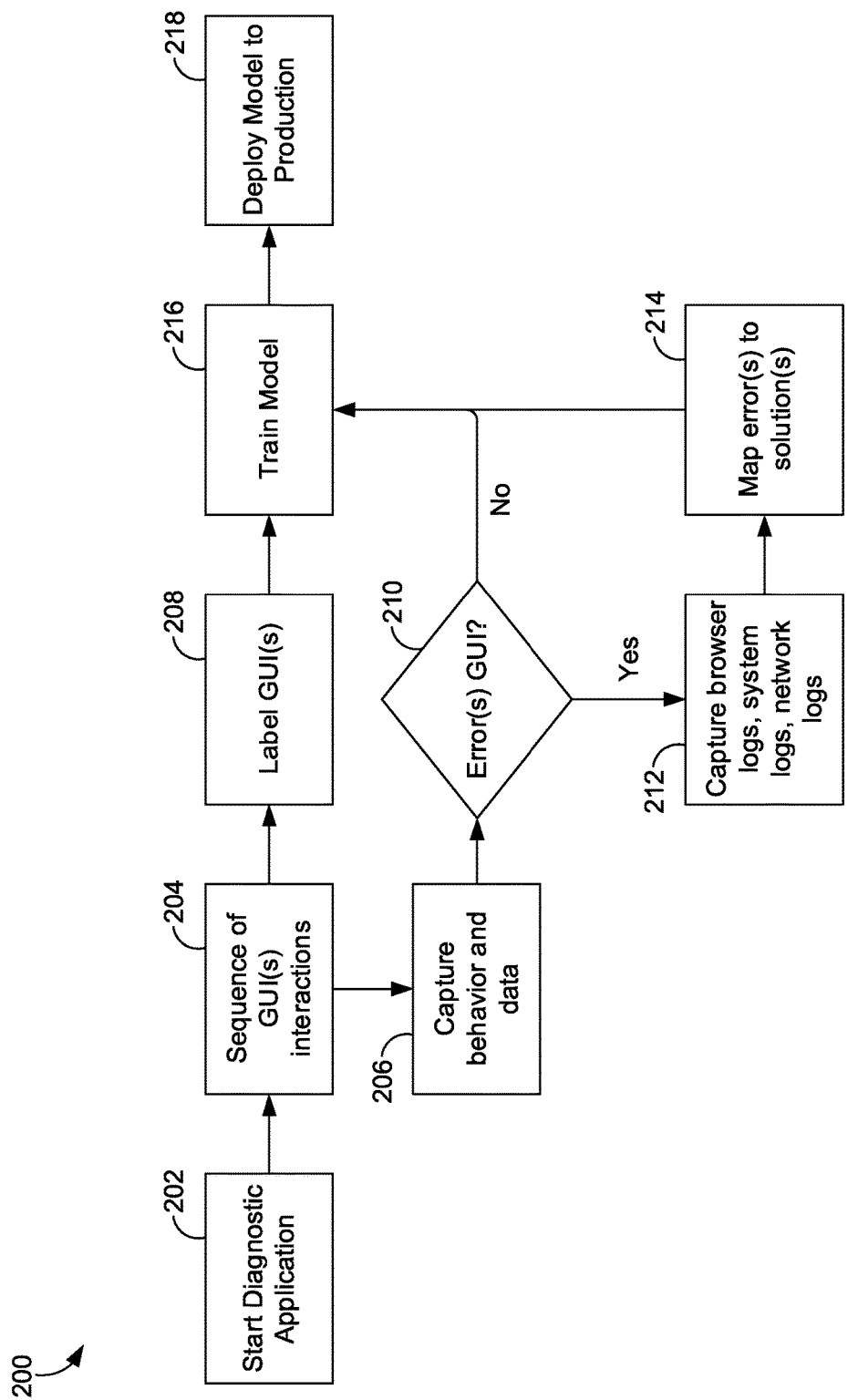
FIG. 2 is a flowchart diagram of an example method for training a machine-learning model, in accordance with aspects of the present disclosure.

FIG. 1 is a block diagram of an example system 100 that is suitable to implement aspects of the present disclosure. Generally, the system 100 includes one or more processors (not shown), a machine-learning model 102 (hereinafter "model"), and a diagnostic application 104 supported by the model 102. The model 102 is a data model that has been trained previously by ingesting a trained data set and leveraging machine-learning and/or artificial intelligence learning techniques. It will be understood from this Description that the model 102 can be retrained any number of times, whether intermittently, periodically, scheduled, and/or by triggering events or instructions, for example. FIG. 2 provides a flowchart diagram of an example method 200 for training the model 102 in the system 100. In order to train the model 102, the diagnostic application 104 can be launched. When launched and initiated, shown at block 202, the diagnostic application 104 automatically and monitors an application that is running or executing on the desktop of a computing device. The application that is monitored is referred to herein as the "target" application. The diagnostic application 104 automatically and autonomously monitors and records all behaviors and all data of the target application that is running on the computing device. Shown at block 204, a user can manually interact with and provide inputs though a sequence of user interfaces in the target application.

During this session of the target application, the target application behaviors, user behaviors, and data can all be captured by the diagnostic application 104, in sequence, and/or in relation to one another, as shown at block 206. For example, actions and functions performed automatically by the target application, as well as actions and functions performed by the target application in reaction to user interaction(s), input(s) (e.g., "clicks," navigation actions through toolbars, selected icons and/or buttons, relative sequences between behavior, data, and user interface screenshots), and the like can be automatically captured and recorded by the diagnostic application 104. Autonomous behavior of the target application can also be monitored.

Data is also captured and recorded by the diagnostic application 104, automatically and autonomously. Data can include, for example, screenshots of graphical user interfaces, a sequence of user interfaces being presented in the target application (i.e., to generated workflow(s)), input values to fields, messages, and output of the target application. Additionally, during this session of the target application, a label can be input and associated with each user interface that is presented by the target application, shown at block 208. For example, labels can be input as input or defined by a user. Labels may be applied to data (e.g., behaviors, screenshots, user interfaces) based on groupings, classifications, or categories for functionalities. In one example, a distinct label could be applied to each user interface, such labels including or designating a category of "billing," "order," "error," and the like. Additionally or alternatively, labels can be classified as positive or negative, as input or defined by a user, for the purpose of the training the model. In one example, a distinct label could be applied to system messages, application messages, and various log data, that correspond to a classification for that message, wherein the classification may represent one or more of network, application, system, hardware (e.g., memory, network card, disk space), security errors, or any combination thereof. In such an example, one or more sublevel labels may be additionally applied to these system messages, application messages, and various log data, that correspond to classifications of increasing granularity, for example, to represent one or more of TCP/IP, Radio, Internet, Internet errors, or any combination thereof. Additionally or alternatively another level of label may include functions or situations, such as "user is not a primary account holder to update billing address," "usage summary is currently down while billing cycle is calculating," or the like. As such, the labels may be organized into a hierarchy (e.g., L3 nested under L2, L2 nested under L1) and one or more labels may be applied to each discrete data item for the purposes of training the model.

During this session of the target application that is being autonomously monitored, an error and/or connectivity issue can occur (e.g., forced by user input/interaction, or spontaneously occurring). Errors and/or connectivity issues, the terms being used interchangeably hereinafter, may be caused by and/or results from failures of the target application, network connectivity problems, software problems at the local device, hardware problems at the local device (e.g., insufficient memory), remote server problems, network outages (e.g., tower upgrades, scheduled maintenance, power outages, natural disaster or geopolitical interruptions), data center outages, and the like. The error, which may include a user interface that displays notice of the error in one example, is shown at block 210. When an error occurs, the diagnostic application 104, which has been capturing all behaviors and data, further obtains additional data, shown at block 212. (In a similar vein, the diagnostic application 104 also recognizes when there has not been an error experienced via the target application and proceeds with monitoring.) The additional data can include, for example, a network log, a browser log, a message, a target application activity log, a screen capture of the user interface that was being presented when or immediately prior to the error occurring, and/or any combination thereof.

The diagnostic application 104 aggregates the additional data that was captured in response to the error occurring with the behavior and data captured by monitoring prior to the error occurring, which will be used as a training data set for the model 102. One or more errors in the network log, browser log, message, target application activity log, or other data can be input to the model 102 for training.

Where possible, when one or more solutions for the error (i.e., a solution that when implemented will address, correct, and/or prevent the error from occurring subsequently) are known, the one or more errors can be individually mapped to the one or more solutions, shown at block 214. Examples of solutions include software updates, hardware driver updates, network package updates, actions to free up local device resources such as memory and processing, and the like. This error-to-solution mapping may results in one or more of several ratios: one error to one solution, a plurality of errors to one solution, one error to a plurality of solutions, and a plurality of errors to a plurality of solutions. The mapping results may also be input to the model 102 for training, shown at block 216.

The model 102 is trained using one or more of the data captured prior to the error occurring, the additional data captured in response to the error, one or more labels for screen captures, an error-to-solution mapping, and/or any combination thereof. The As will be understood from this Description, all possible sequences of the user interfaces, navigations, user inputs, and/or user interactions with the target application are learned by the model 102 through this training, for example, based on labels, mapping, and all data ingested. The model 102 is also trained to learn and identify geospatial alignment, temporal alignment, and/or geospatial-temporal alignment occurring between discrete data items in the ingested data, as potential related to the error and/or connectivity issue. In this manner, the model 102 self-learns and generates classes or classifications 106 for errors and a related solution, when available from a mapping, shown in FIG. 1. Once trained, the model 102 can be deployed, shown at block 218, for implementation through the diagnostic application 104 in real-world scenarios.

Continuing with FIG. 1, the diagnostic application 104 that is supported by the model 102 can be run or executed via one or more processors locally at the computing device that runs the target application, remotely, in a distributed network, such as the cloud, or in a hybrid configuration (e.g., the diagnostic application is partially executed/run at the at the computing device that runs the target application while another portion is executed/run remotely). Examples of the network 110 in FIG. 1 include a telecommunications network (e.g., 3G, 4G, 5G, CDMA, CDMA 1XA, GPRS, EvDO, TDMA, GSM, LTE, and/or LTE Advanced). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMax) network, and/or an ad-hoc (mesh) network. The network 110 may include or may communicate with one or more remote devices 112A, 112B, 112C, and 112D in order to obtain a geographic location of those devices, for example, using data such as an IP address and/or other techniques, such as Global Positioning System (GPS), Globalnaya Navigazion-naya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity (SOP)). Although the model 102 is depicted in FIG. 1 as integrated into the diagnostic application 104, it will be understood from this Description that the model 102 may be stored separately from, but accessible to, the diagnostic application 104, via the network 110.

Figure 3:
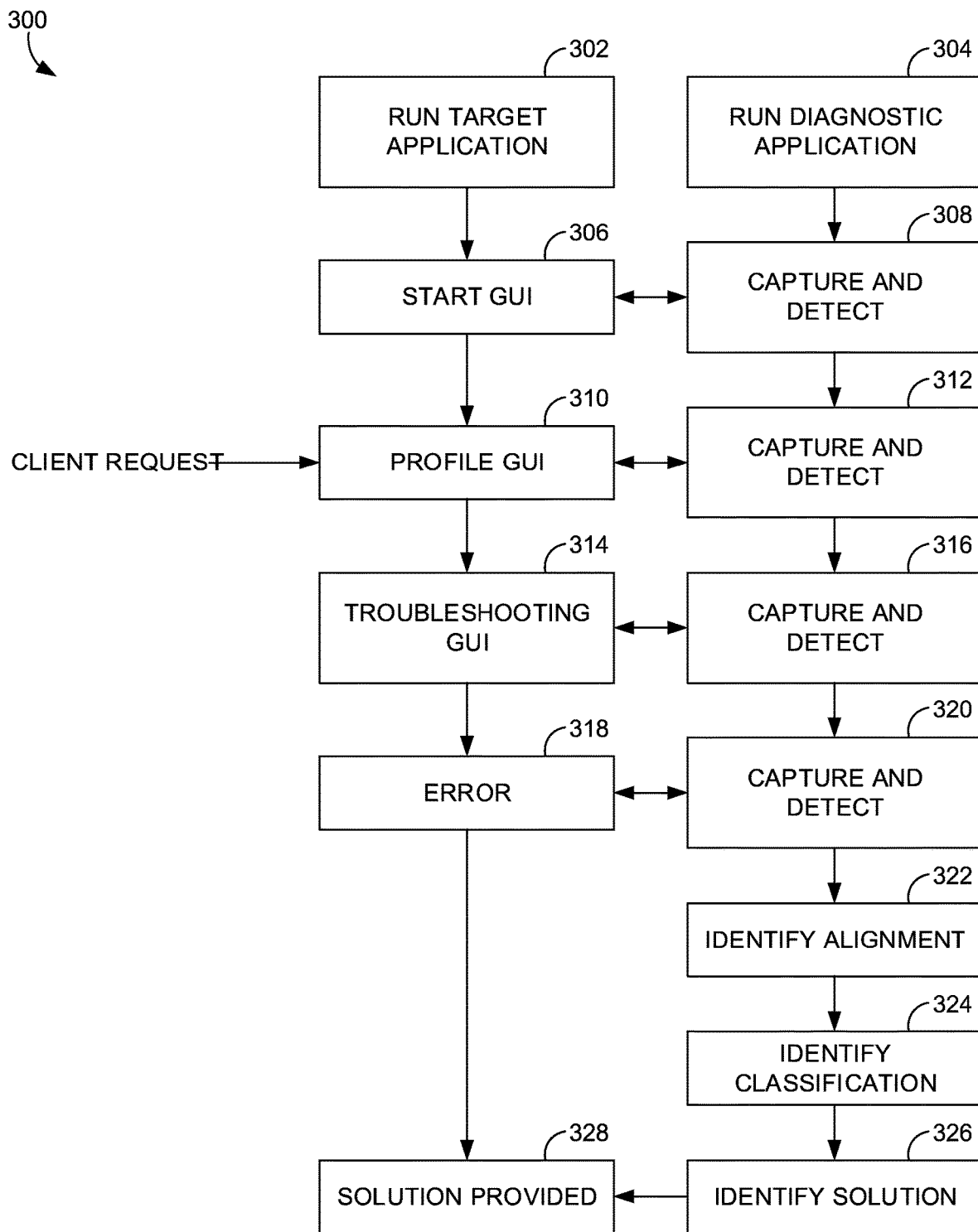
FIG. 3 is a flowchart diagram of an illustrative use case involving the diagnostic application supported by the machine-learning model of FIG. 2, in accordance with aspects of the present disclosure.

The diagnostic application 104 can be executed in order to monitor, using a real-time capture tool 108, one or more applications 114 of a computing device 116 in order to detect errors using a detection tool 118. Any of the one or more applications may be monitored. For example, FIG. 3 is a flowchart diagram 300 of an illustrative use case involving the diagnostic application 104 as supported by the model 102 subsequent to training. In this example, a target application and the diagnostic application 104 are executed in tandem and/or concurrently, such that the diagnostic application 104 is able to automatically and autonomously monitor the target application. As such, the target application is initiated 302 and the diagnostic application 104 is initiated or is running 304, either automatically or manually triggered. The target application causes display 306 of an initial graphical user interface at the computing device. Concurrently and in real-time with the display 306 of the initial graphical user interface, the diagnostic application 104 captures information and data in real-time, and further, automatically detects whether an error has occurred or has not occurred, shown at 308. As an error is not detected, the diagnostic application 104 continues its processes in the background without interruption. In this example, in response to receipt of a client request 311 and/or additional user interaction(s) at the computing device running the target application, the target application navigates to and causes display 310 of a client-specific profile graphical user interface at the computing device. Concurrently and in real-time with the display 310, the diagnostic application 104 captures information and data, and further, automatically detects 312 whether an error has occurred or has not occurred. As an error is not detected, the diagnostic application 104 continues. Through additional user interaction(s) at the computing device running the target application, the target application navigates to and causes display 314 of one or more troubleshooting graphical user interfaces at the computing device, for example, as responsive to the client request and/or additional user interaction(s). Concurrently and in real-time with the display 310, the diagnostic application 104 captures information and data, and further, automatically detects 316 whether an error has occurred or has not occurred.

In the example of FIG. 3, an error and/or connectivity issue occurs 318 in the target application. For example, an error may occur and a pop-up window may be presented in the user interface to indicate the error. Concurrently and in real-time with the display 310, the diagnostic application 104 captures information and data, and further, automatically detects 320 that an error has occurred. The error may be automatically detected based on, for example, an error displayed in a user interface, one or more elements being detected as missing or omitted from a user interface, and/or a user interface failing to load, either partially or completely. In one example, the same or similar error displayed in the user interface has been previously labeled during training of the model, such that the model automatically detects the error based on the error displayed and/or text in the error displayed, in the present instance. Automatically and without requiring manual input, the diagnostic application 104 responds to its detection of the error by automatically obtaining data, the data including one or more of a network log, a browser log, a message, a target application activity log, a screen capture of the user interface, and/or any combination thereof. Additional data may be obtained from an external source, such as a server, route, switch, or remote Application Programming Interface (API). The data is then provided to the model 102 in real-time with the error detection. Additionally, in some instances, the diagnostic application 104 generates and stores a record that can act as a "ticket" for tracking the detected error and/or related errors, for example, in response to detecting the error. The record may include the data captured and obtained by the diagnostic application 104, as well a timestamp, local device identifiers, network identifiers, user identifiers, and the like. Such a record can be stored locally or remotely in a repository (not shown). The same or a different repository may also be used to store the machine-learning model's intelligence, prior determinations, and error/connectivity issue classifications, as further discussed hereinafter. Although this example discusses an error that is displayed, errors that are not visible to a user can similarly be detected in real-time, analyzed, and recorded.

When the model 102 receives the data in the example of FIG. 3, the model 102 identifies 322 one or more of a geospatial alignment, a temporal alignment, or a geospatial-temporal alignment of the data obtained for the error. For example, the model 102 may identify that discrete data items correlate to one another based on location, time, or a combination thereof. Examples of such data items may include a particular error documented and identified in the network log, a particular error recorded in a message, a particular error documented and identified in the target application activity log, and a particular error displayed and/or identified in a screen capture of the user interface. In some aspects, the model 102 can segment the data obtained in response to detecting the error based on geographic location, data and time of occurrence, the specific target application, a group of related applications that includes the target application, user identifiers associated with the computing device, or any combination thereof. This data segmentation by the model 102 can be utilized in identifying whether the data for the detected error may correspond to one or more classifications of errors known by the model 102, based on its training.

The model 102 further identifies 324 in FIG. 3 that the error corresponds to a particular classification based on the one or more of geospatial alignment, temporal alignment, or geospatial-temporal alignment the model 102 identified. For example, the model 102 can identify when a pattern that is associated with the geospatial alignment, the temporal alignment, and/or the geospatial-temporal alignment identified is the same or similar to a pattern that corresponds to one or more particular classifications generated when the model 102 was trained. As such, when a pattern in the present error data "aligns" with a pattern of a learned classification based on geospatial and/or temporal occurrence information, the model 102 can predict that the present error data is the same, similar, or related to prior-learned error(s) in that same classification, as learned by the model 102 via the error(s) evaluated in the training data set. Additionally or alternatively, the model 102 can map the error to classification based on another identifiable and learned pattern in the data, which may not be geospatial and/or temporally aligned.

The model 102 continues by identifying 326 a solution (when solutions are known to the model 102 through training, mapping, and/or feedback) to the detected error based at least in part on the detected error being sufficiently matched to a particular classification that is associated with similar or related error(s). In such aspects, the diagnostic application 104 provides 328, in real-time and based on the particular classification identified, the solution for the error to the computing device, as shown in the example of FIG. 3. Additionally, in some aspects, the diagnostic application 104 automatically provides the solution for the error to another computing device that is associated with another error that the is the same as, similar to, or related to the present error, as determined by the model 102.

Alternatively or in additional instances of errors, when a solution is unknown by the model 102, the record or "ticket" that was generated for the error can be automatically provided by the diagnostic application 104 to a user of the computing device, to a backend end computing device, and/or to another user for troubleshooting. As such, subsequent instances of detected errors that exhibit the same, similar, or related geospatial/temporal pattern can also be stored in this same record—such that the record that aggregates all the error data across multiple instances in one record. When a solution is subsequently learned by the model 102 or otherwise resolved, the record can be used to automatically provide the solution to the computing devices that experienced the error via the target application.

Having described the system 100 and components thereof with regard to FIGS. 1-3, it will be understood by those of ordinary skill in the art that system 100 is but one example of a suitable system and is not intended to limit the scope of use or functionality of the present invention. Similarly, system 100 should not be interpreted as imputing any dependency and/or any requirements with regard to each component and combination(s) of components illustrated in FIGS. 1-2. It will be appreciated by those of ordinary skill in the art that the location of components illustrated in FIGS. 1-2 is an example, as other methods, hardware, software, components, and devices for establishing a communication links between the components shown in FIGS. 1-2, may be utilized in implementations of the present invention. It will be understood to those of ordinary skill in the art that the components may be connected in various manners, hardwired or wireless, and may use intermediary components that have been omitted or not included in FIGS. 1-2 for simplicity's sake. As such, the absence of components from FIGS. 1-2 should be not be interpreted as limiting the present invention to exclude additional components and combination(s) of components. Moreover, though components are represented in FIGS. 1-2 as singular components, it will be appreciated that some embodiments may include a plurality of devices and/or components such that FIGS. 1-2 should not be considered as limiting the number of a device or component.

Figure 4:
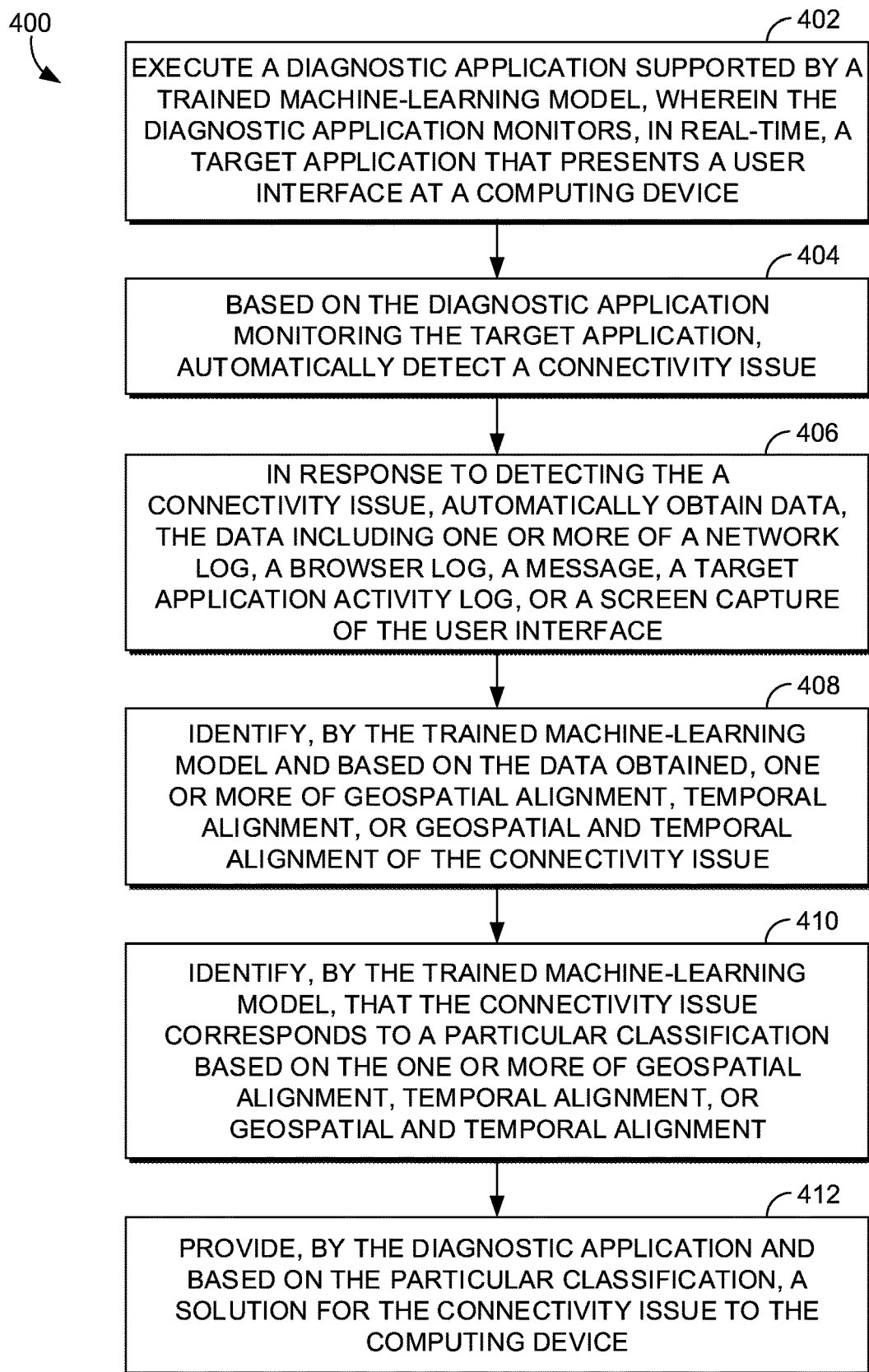
FIG. 4 is a flowchart diagram of an example method for performance via a diagnostic application supported by the trained machine-learning model of FIG. 2, in accordance with aspects of the present disclosure.

Turning now to FIG. 4, a flowchart diagram of an example method 400 is provided for performance via the diagnostic application 104 that is supported by the trained machine-learning model of FIG. 2. In some embodiments, the method 400 can be a computer-implemented method. In one embodiment, one or more non-transitory computer-readable storage media having computer-readable instructions or computer-readable program code portions embodied thereon, for execution via one or more processors, can be used to implement and/or perform the method 400. For example, computer-readable instructions or computer-readable program code portions can specify the performance of the method 400, can specify a sequence of steps of the method 400, and/or can identify particular component(s) of software and/or hardware for performing one or more of the steps of the method 400, in embodiments. The computer-readable instructions or computer-readable program code portions can correspond to an application and/or an application programming interface (API), in some embodiments. In one embodiment, the application or API can implement and/or perform the method 400. As discussed below, the method 400 can be performed using software, hardware, component(s), and/or device(s) depicted in the examples of FIGS. 1 and/or 2. For brevity, some aspects of the method 400 which have already been discussed with regard to FIGS. 1-3 are only described briefly hereinafter.

At block 402, a diagnostic application is executed that is supported by a trained machine-learning model, where the diagnostic application monitors, in real-time, a target application that presents a user interface at a computing device.

Based on the diagnostic application monitoring the target application, a connectivity issue is automatically detected by the diagnostic application, shown at block 404. In some aspects, the diagnostic application can automatically generate and store a record of the connectivity issue based on its detection.

In response to detecting the a connectivity issue, data is automatically obtained that includes one or more of a network log, a browser log, a message, a target application activity log, or a screen capture of the user interface, at block 406.

In various aspects, the diagnostic application and/or the model segment the data obtained into a subset of discrete data items that contain any error and another subset of discrete data items that do not contain any immediately identifiable error, such an error message. The diagnostic application and/or the model may selectively focus on and further segment the subset of discrete data items that contain any error as an efficient technique to identify the error, while examining the other subset of discrete data items that do not contain any immediately identifiable error subsequently, if needed. In some aspects, the diagnostic application and/or the model segment the data obtained based on the error type that is associated with each discrete item in the data. In one aspect, the diagnostic application and/or the model segment the data obtained based on a location associated with each discrete data item in the data. The diagnostic application and/or the model segment may segment the data obtained based on whether the target application is associate with each discrete data item in the data, in yet another example. In various aspects, the diagnostic application and/or the model may segment the data based on the error type that is associated with each discrete item in the data, based on a location associated with each discrete data item in the data, based on whether the target application is associate with each discrete data item in the data, or any combination thereof. As such, the diagnostic application and/or the model may initially segment data in a hierarchal fashion, for example, first by whether the data includes any error at all, and then may further segment that subset of data that contains an error by specific error types, and so on, for example based on location, timestamp, and more, as previously described with regard to labels. Examples of error types may include system errors, user permission errors, application permission errors, data quality errors (e.g., missing data), and others as described herein. Additionally or alternatively, segmentation may be performed based on error severity, error occurrence frequency, and/or host type (e.g., cloud provider for a particular region). As such, the diagnostic application and/or the model can segment the data and drill down into different subsets of data.

At block 408, the trained machine-learning model automatically identifies, based on the data obtained, one or more of geospatial alignment, temporal alignment, or geospatial and temporal alignment of the connectivity issue. In aspects, the model 102 identifies whether a plurality of the discrete data items obtained in response to detecting the connectivity issue correspond to the same, similar, or related location(s). Additionally, the model identifies whether that same plurality or another plurality of the discrete data items obtained in response to detecting the connectivity issue correspond to the same, similar, or related and/or date and time, for example. Further, the model identifies whether the same or a different plurality of the discrete data items obtained in response to detecting the connectivity issue correspond to the same, similar, or related locations, as well as the same, similar, or related date and time, for example. The model makes these determinations to identify alignments or the discrete data items, and further uses this alignment to identify one or more patterns in the data that was obtained in response to detecting the connectivity issue.

The trained machine-learning model can further determine or predict that the connectivity issue occurs upstream from the computing device when temporal alignment of the data is associated with a plurality of different locations, for example. In another example, the trained machine-learning model can further determine that the connectivity issue occurs downstream from the computing device when temporal alignment of the data is associated with one location. The model can leverage such upstream/downstream predictions when working to identify the specific connectivity issue and/or for providing later solutions, as discussed herein.

The trained machine-learning model identifies that the connectivity issue corresponds to a particular classification based on the one or more of geospatial alignment, temporal alignment, or geospatial and temporal alignment, at block 410. In some aspects, the model maps the connectivity issue to a classification based on a pattern in the data obtained. Based on the identification of the classification for the connectivity issue, the model can automatically identify a solution that corresponds to the classification, when known. Then, the diagnostic application provides a solution for the connectivity issue to the computing device based on the particular classification, as shown at block 412. In some further aspects, the diagnostic application automatically provides the solution for the connectivity issue to another computing device associated with another connectivity issue detected and determined to be relate by the machine-learning model, for example, as belonging to the same particular classification and/or as having a similar geospatial, temporal, and/or geospatial-temporal alignment to the present connectivity issue. In some aspects, the identified connectivity issue, the classification, a known solution, and/or additional data related to the connectivity issue, the classification, and/or the known solution can be provided to a user of the computing device in real-time. The user may be prompted to confirm receipt and/or take steps to implement the solution, in some further aspects. User input confirming that the solution is implemented and that the connectivity issue is resolved, for example, can be received based on a diagnostic application-provided prompt. Such confirmation can also be fed back into the model for retraining and increasing the accuracy of the model's predictions and its classification system, in such an example.

Additionally, in some aspects, subsequent to providing a solution or other information to the computing device, the diagnostic application again obtains data associated with that session of the target application for the purpose of retraining the model. The data includes, for example, behavior of the applications and a user. For example, the data can include a network log, a browser log, a message, a target application activity log, screen captures of the user interface, or any combination thereof. For example, as mentioned with regard to training the model in FIG. 2, screenshots of the graphical user interfaces presented in the target application for that session, a sequence of user interfaces being presented in the target application for that session (i.e., to generated workflow(s)), input values to fields received in the target application for that session, messages received or sent during the target application session, and/or output of the target application can all be captured. A label can be input and associated with each user interface that is presented by the target application, in some aspects. All of this post-session captured data is ingested by the model and used to update and retrain the model.

Figure 5:
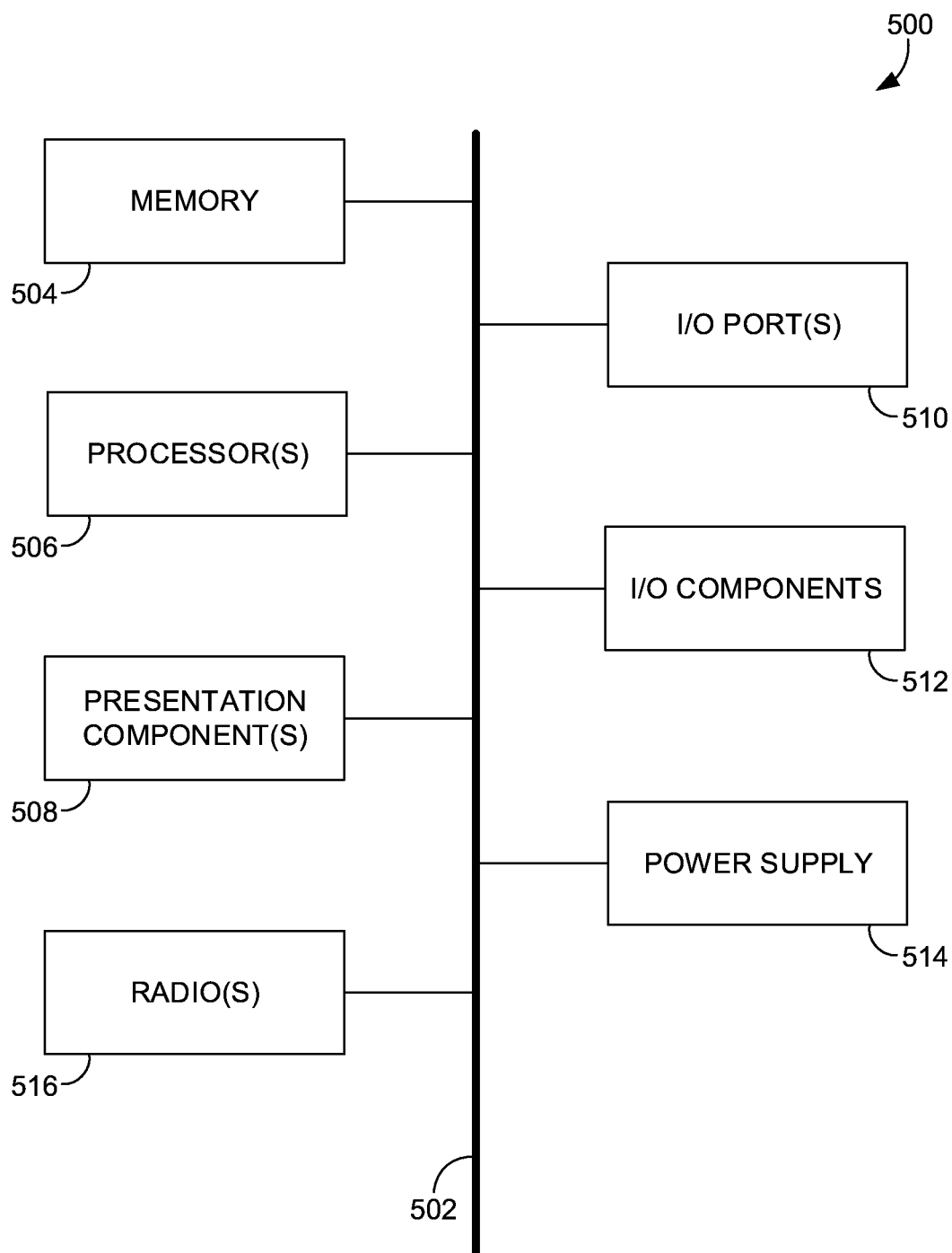
FIG. 5 is a block diagram of an example computing environment suitable for use in implementations of the present disclosure.

Turning now to FIG. 5, a diagram is depicted of an example computing device suitable for use in implementations of the present disclosure. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. Distinction is not made between such categories as "workstation," "server," "laptop," "handheld device," etc., as all are contemplated within the scope of FIG. 8 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, non-removable, or a combination thereof. Examples of memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Examples of one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method comprising:
   detecting, by a diagnostic application that monitors a target application at a computing device, a connectivity issue;
   automatically obtaining data based on the connectivity issue that is detected, wherein the data comprises one or more of a network log, a browser log, a message, a target application activity log, or a screen capture of the user interface;
   identifying whether there is a temporal alignment and whether there is a geospatial and temporal alignment of the connectivity issue;
   when the temporal alignment is identified and associated with one location, determining the connectivity issue occurs downstream from the computing device;
   when the temporal alignment is identified and associated with a plurality of different locations, determining the connectivity issue occurs upstream from the computing device; and
   providing, by the diagnostic application, a solution for the connectivity issue to the computing device based on the connectivity issue and whether the connectivity issue occurs downstream or upstream.

2. The method of claim 1, further comprising automatically providing, by the diagnostic application, the solution for the connectivity issue to another computing device associated with another connectivity issue detected and determined to be related by the trained machine-learning model.

3. The method of claim 1, further comprising:
   segmenting the data obtained based on error type associated with each discrete item in the data;
   segmenting the data obtained based on correspondence to the target application;
   segmenting the data obtained based on a location associated with each discrete data item in the data; or
   segmenting the data obtained based on whether the target application is associated with each discrete data item in the data.

4. The method of claim 3, further comprising determining that one or more of the following data correlate to each other based on location, time, or a combination thereof:
   an error in the network log;
   an error in a message;
   an error in the target application activity log; or
   an error based on the screen capture of the user interface.

5. The method of claim 1, further comprising in response to detecting the connectivity issue, automatically generating and storing a record of the connectivity issue detected.

6. The method of claim 5, further comprising:
   mapping, by the trained machine-learning model, the connectivity issue to the particular classification based on a pattern in the data obtained; and
   automatically identifying, by the trained machine-learning model, the solution for the particular classification.

7. The method of claim 1, further comprising one or more of:
   identifying a pattern associated with the temporal alignment; or
   identifying a pattern associate with the geospatial alignment.

8. The method of claim 7, further comprising one or more of:
   matching one or more of the patterns associated with the temporal alignment or the geospatial alignment to a pattern that corresponds to a particular classification in the trained machine-learning model.

9. One more non-transitory computer-readable media having computer-executable instructions embodied thereon that, when executed, perform a method for monitoring network performance, the media comprising:
   detecting, by a diagnostic application that monitors a target application at a computing device, a connectivity issue;
   automatically obtaining data based on the connectivity issue being detected, the data including one or more of a network log, a browser log, a message, a target application activity log, or a screen capture of the user interface;
   identifying whether there is a temporal alignment and whether there is a geospatial and temporal alignment of the connectivity issue;
   when the temporal alignment is identified and associated with one location, determining the connectivity issue occurs downstream from the computing device;
   when the temporal alignment is identified and associated with a plurality of different locations, determining the connectivity issue occurs upstream from the computing device; and
   providing, by the diagnostic application, a solution for the connectivity issue to the computing device based on the connectivity issue.

10. The media of claim 9, further comprising automatically providing, by the diagnostic application, the solution for the connectivity issue to another computing device associated with another connectivity issue detected and determined to be related by the trained machine-learning model.

11. The media of claim 9, further comprising:
    segmenting the data obtained based on error type associated with each discrete item in the data;
    segmenting the data obtained based on correspondence to the target application;
    segmenting the data obtained based on a location associated with each discrete data item in the data; or
    segmenting the data obtained based on whether the target application is associated with each discrete data item in the data.

12. The media of claim 11, further comprising determining that one or more of the following data correlate to each other based on location, time, or a combination thereof:
    an error in the network log;
    an error in a message;
    an error in the target application activity log; or
    an error based on the screen capture of the user interface.

13. The media of claim 9, further comprising in response to detecting the connectivity issue, automatically generating and storing a record of the connectivity issue detected.

14. The media of claim of claim 13, further comprising:
    mapping, by the trained machine-learning model, the connectivity issue to the particular classification based on a pattern in the data obtained; and
    automatically identifying, by the trained machine-learning model, the solution for the particular classification.

15. The media of claim 9, further comprising one or more of:
    identifying a pattern associated with the temporal alignment; or
    identifying a pattern associate with the geospatial alignment.

16. The media of claim 15, further comprising one or more of:
- matching one or more of the patterns associated with the temporal alignment or the geospatial alignment to a pattern that corresponds to a particular classification in the trained machine-learning model.

17. A system comprising:
one or more processors;
a machine-learning model; and
a diagnostic application supported by the machine-learning model and that is executed locally or remotely via the one or more processors, wherein the diagnostic application:
- detects, at a computing device, a connectivity issue;
- automatically obtains data based on the connectivity issue being detected, the data including one or more of a network log, a browser log, a message, a target application activity log, or a screen capture of the user interface;
- identifies whether there is a temporal alignment and whether there is a geospatial and temporal alignment of the connectivity issue;
- when the temporal alignment is identified and associated with one location, determines the connectivity issue occurs downstream from the computing device;
- when the temporal alignment is identified and associated with a plurality of different locations, determines the connectivity issue occurs upstream from the computing device; and
- provides a solution for the connectivity issue to the computing device based on the connectivity issue.

18. The system of claim 17, further comprising automatically providing, by the diagnostic application, the solution for the connectivity issue to another computing device associated with another connectivity issue detected and determined to be related by the trained machine-learning model.

19. The system of claim 17, further comprising one or more of:
- identifying a pattern associated with the temporal alignment; or
- identifying a pattern associate with the geospatial alignment.

20. The system of claim 19, further comprising one or more of:
- matching one or more of the patterns associated with the temporal alignment or the geospatial alignment to a pattern that corresponds to a particular classification in the trained machine-learning model.

* * * * *